(12) United States Patent
Forrest (10) Patent No.: US 6,481,930 B2
(45) Date of Patent: Nov. 19, 2002

(54) APPARATUS AND METHOD FOR INSERTING AND REMOVING A FLEXIBLE FIRST MATERIAL INTO A SECOND MATERIAL

(75) Inventor: John Forrest, Houston, TX (US)

(73) Assignee: Longbore, Inc., Houston, TX (US)

(*) Notice: Subject to any disclaimer, the term of this patent is extended or adjusted under 35 U.S.C. 154(b) by 44 days.

(21) Appl. No.: 09/727,428

(22) Filed: Nov. 30, 2000

(65) Prior Publication Data

US 2002/0064428 A1 May 30, 2002

(51) Int. Cl.[7] .................................................. E02F 5/10
(52) U.S. Cl. ........................ 405/184; 405/174; 405/177; 175/122; 175/162; 175/62; 173/55; 173/147
(58) Field of Search .............................. 405/184, 174, 405/177; 175/122, 162, 62; 173/53, 54, 55, 147, 141, 152

(56) References Cited

U.S. PATENT DOCUMENTS

| | | | | |
|---|---|---|---|---|
| 3,022,042 A | * | 2/1962 | Orcutt ........................ | 226/163 |
| 3,708,024 A | * | 1/1973 | Back .......................... | 173/147 |
| 3,951,216 A | * | 4/1976 | Crawshay et al. .......... | 173/156 |
| 4,368,873 A | * | 1/1983 | Perry ......................... | 173/27 |
| 4,407,629 A | * | 10/1983 | Willis ......................... | 175/52 |
| 4,434,969 A | * | 3/1984 | Von Ruden ................ | 254/29 R |
| 4,604,724 A | * | 8/1986 | Shaginian et al. ........... | 166/53 |
| 4,708,581 A | * | 11/1987 | Adair .......................... | 175/85 |
| 4,889,450 A | * | 12/1989 | Anne .......................... | 285/27 |
| 4,955,757 A | * | 9/1990 | Balling ....................... | 173/53 |
| 5,148,875 A | * | 9/1992 | Karlsson et al. ............ | 175/259 |
| 6,315,498 B1 | * | 11/2001 | Baugh et al. ................ | 166/383 |

* cited by examiner

Primary Examiner—Heather Shackelford
Assistant Examiner—Kathy Mitchell
(74) Attorney, Agent, or Firm—J. Nevin Shaffer, Jr.; Shaffer & Culbertson, LLP (57) ABSTRACT

An apparatus for inserting and removing a flexible first material into a second material (20) includes a moveable carriage (22). An adjustable clamp (24) is connected to the moveable carriage (22), adjustable between an open position and a clamped position on the first flexible material. In a preferred embodiment, a receiver stiffener casing (26) is configured to receive and support the flexible first material as the flexible first material is inserted into and removed from the second material.

46 Claims, 12 Drawing Sheets

APPARATUS AND METHOD FOR INSERTING AND REMOVING A FLEXIBLE FIRST MATERIAL INTO A SECOND MATERIAL

TECHNICAL FIELD

This invention relates to an apparatus and method for inserting, and removing, a flexible first material into a second material. In particular, the invention relates to an apparatus and method for installation and extraction of pipelines in boreholes. Even more particularly, the invention relates to an apparatus and method for installation and extraction of pipelines in horizontally directionally drilled boreholes.

BACKGROUND OF THE INVENTION

Many forces come into play whenever it is necessary for one material to be inserted into another material. In the case where a flexible first material is inserted into a second material, one of the major forces that must be accounted for is buckling load. As is known in the art, the "Euler" buckling load for simple column buckling is determined from the relationship between material modulus of elasticity (E), moment of inertia (I) for the column, and the square of the column length (L). Buckling load, therefore, is proportional to: $(E)(I)L^2$. The stiffness and/or flexibility of the first material is a determinant of the strength of it under axial compression. If more buckling load is encountered than the "stiffness" of the flexible first material can accommodate, the flexible first material will be distorted, or fail, or both.

By way of background, an example from the field of installing and removing pipelines in horizontally directionally drilled boreholes is provided. A variety of techniques have been developed for creating horizontally directionally drilled boreholes. One technique is described as a "continuous well" where the borehole enters the ground at one point, traverses underground for some distance and then exits the ground at a second point. Another technique is described as a "blind well" where the borehole enters the ground at one point traverses underground for some distance and then stops. In some cases, the borehole enters the ground at one point, traverses underground for some distance and then exits from the ground into another medium such as water.

No matter the technique that is used, drilling the borehole is necessarily followed by the requirement of placing a pipe in the borehole. Immediately, the problems of axial compression loads and buckling limits are encountered. One prior art attempt to overcome these problems is to pull on the leading end of the pipe at the same time it is being pushed into the borehole. This procedure, however, requires pulling equipment to be established at the exit of the borehole, adding cost to the procedure. In some cases, however, there may be no room at the exit of the borehole for setting up the pulling equipment. Obviously, in other cases, such as with a blind well, there is simply no way that a pulling force may be applied to the leading end of the pipe. The most common procedure for completion of a continuous well in a borehole is to assemble the pipe on the exit side, space permitting, and to pull the pipe back to the entry hole by means of the drillpipe.

Other factors contribute to the difficulties of placing a pipe in the borehole. One factor concerns how the pipe is constructed. In the prior art, long sections of pipe, plastic and metal, are created by the use of screw joints. By way of example, in order to create a one thousand foot length of HDPE plastic pipe from fifty sections twenty feet long, it is first necessary to weld one male and one female end to two separate sections of pipe. For one thousand feet of pipe, these two welds for each section, one for each end, typically take two days to create and cost approximately $220.00 each or a total of $11,000.00. Additionally, the male/female joint has an outside diameter in most cases that is larger than the outside diameter of the section of pipe between the joint. In the normal case, then, additional borehole reaming is required in order to accommodate the increased diameter of the joints. A representative amount of time added by this requirement for additional borehole reaming is ten days rig time or one hundred and twenty hours. Also, in a pipe line installation of this kind, a typical pipe line installation time is sixteen hours of rig time. This time includes, among other things, the time it takes to join each joint prior to insertion into the borehole.

This time-consuming and costly procedure which is now the current state-of-the-art is further limited by the fact that the pipe line is only as strong as its weakest point which happens to be at the point of the multiple male and female joints. Failure of the pipe, breaking completely or partially, and/or leaking at the joints, is commonplace particularly when the material, ground, into which the pipe is inserted, resists insertion of the pipe. That is to say, in most cases, the friction encountered during insertion of pipe in the ground generates significant axial compression loads which cause deflection and/or failure of the pipe. These problems exist with thin wall metal pipelines, well screens and any other long thin cylinders placed in directionally drilled boreholes.

Thus, there is a need in the art for providing an apparatus and method for inserting, and removing, a flexible first material into a second material that overcomes the deficiencies found in the prior art. It, therefore, is an object of this invention to provide an apparatus and method for inserting, and removing, a flexible first material into a second material that is easy to use and inexpensive; that decreases the time required for inserting and/or removing the flexible first material; that enables the use of existing drilling machinery; and which does not require the leading end of the flexible first material to be pulled.

SHORT STATEMENT OF THE INVENTION

Accordingly, the apparatus for inserting, and removing, a flexible first material into a second material includes a movable carriage. An adjustable clamp is connected to the movable carriage and is adjustable between an open position and a clamped position on the flexible first material. In a preferred embodiment, in cases where the resisting friction forces are high or the buckling strength of the flexible first material is low, a receiver stiffener casing is configured to receive and support the flexible first material as the flexible first material is inserted into and removed from the second material.

In a preferred embodiment, in a slant drill rig with a stationary track and a movable drill for drilling a borehole in the ground, a push-pull apparatus for inserting and removing cylindrical tubing in the borehole includes a carriage attached to the movable drill. An adjustable clamp is connected to the carriage, adjustable between an open position and a clamped position on the cylindrical tubing. In a preferred embodiment, in cases where the resisting friction forces are high or the buckling strength of the flexible first material is low, a receiver stiffener casing is configured to receive and support the cylindrical tubing as the cylindrical tubing is inserted into and removed from the borehole. In a further preferred embodiment, the adjustable clamp includes two halves conformed to the dimensions of the exterior of the cylindrical tubing. In another preferred embodiment, the adjustable clamp is hydraulically operable and provides progressive grip pressure in the clamped position. In other preferred embodiments the two halves are split horizontally and are separated by a longitudinal gap when in the clamped position.

In a still further preferred embodiment, an axial tilt device is connected to the adjustable clamp. In another preferred embodiment, the receiver stiffener casing is connected to the slant drill rig by means of a drill rig connection. Other preferred embodiments of the apparatus of the present invention are disclosed more fully hereafter.

A method for inserting a flexible first material into a second material includes the steps of providing a movable carriage and attaching an adjustable clamp to the movable carriage so that the adjustable clamp is adjustable between an open position and a clamped position on the flexible first material. In a preferred embodiment, in cases where the resisting friction forces are high or the buckling strength of the flexible first material is low, a casing is provided and configured to receive and support the flexible first material as the flexible first material is inserted into the second material. The flexible first material is placed within the adjustable clamp and the adjustable clamp is placed in the clamped position. At that point, the movable carriage is moved so as to pass a leading end of the flexible first material into the second material beginning with the leading end. In a further preferred embodiment of the method, the adjustable clamp is placed in the open position and the movable carriage is moved away from the leading end. The adjustable clamp is then placed in the clamped position and the movable carriage is moved toward the leading end. These steps are repeated continuously until a desired amount of flexible first material has been inserted into the second material. Other preferred embodiments of the method of the present invention, including the preferred embodiment of the method for removing the flexible first material from the second material, are discussed and disclosed more fully hereafter.

BRIEF DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
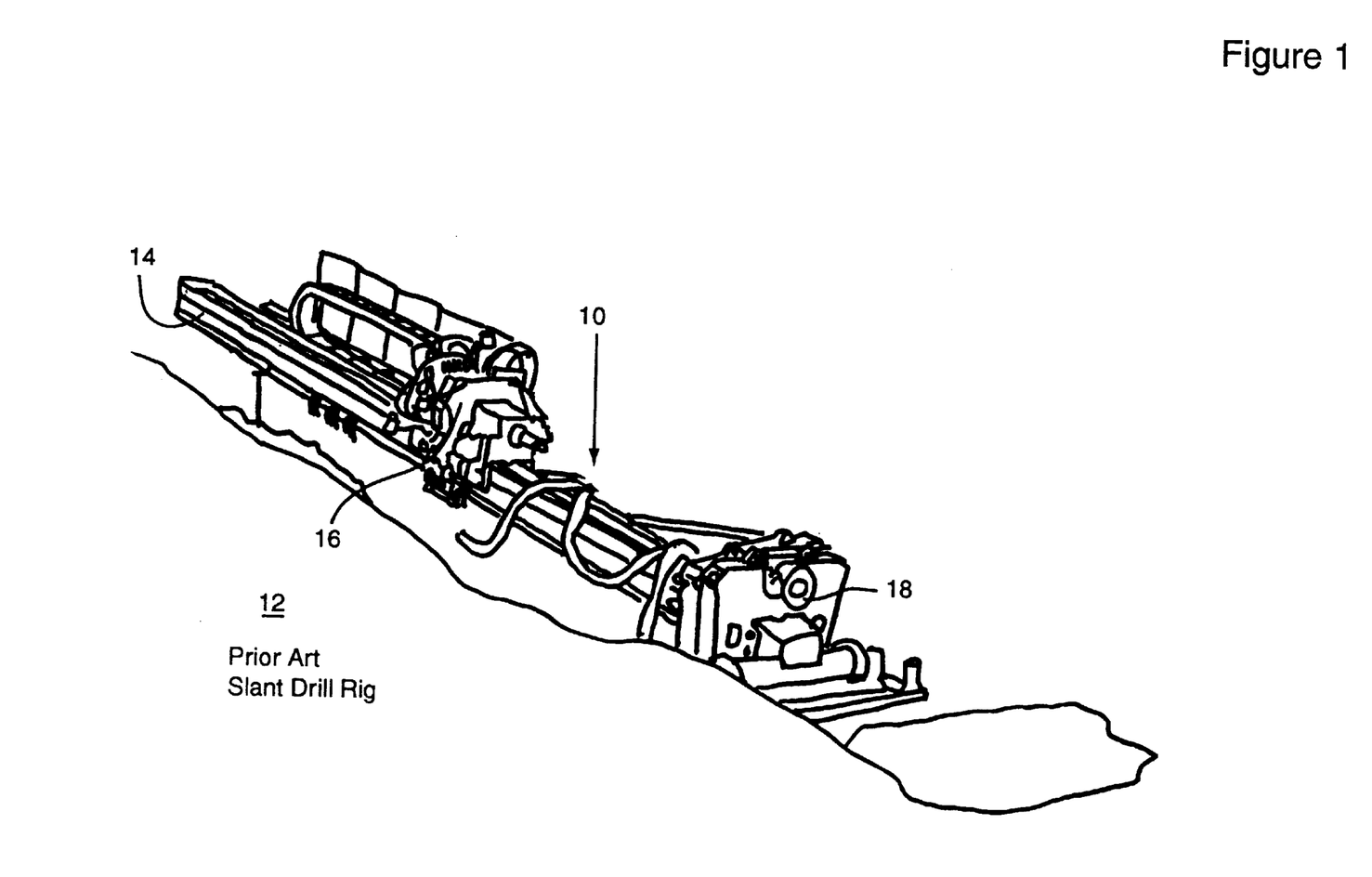
FIG. 1 is a perspective view of a prior art slant drill rig.

The preferred embodiment of the present invention is illustrated by way of example in FIGS. 2–14. Beginning with FIG. 1, a prior art slant drill rig 10 is shown in position on a drill site preparing to drill a borehole in the ground 12. Because the details of the slant drill rig 10 are well-known to those of ordinary skill in the art, no effort is made to list them all. Nonetheless, for the purposes of the present invention, slant drill rig 10 includes, among other things, stationary track 14, drill 16, and rig vices 18. The drill 16 moves up and down stationary track 14 in the ordinary course of drilling a borehole. Again, for the purposes of the present invention, multiple elements of the drill rig 10 are collectively referred to as drill 16. That is, drill 16 herein includes the motor that applies thrust and pull forces against stationary track 14, in addition to applying rotary torque to rotate the drill string, as is known in the art.

Figure 2:
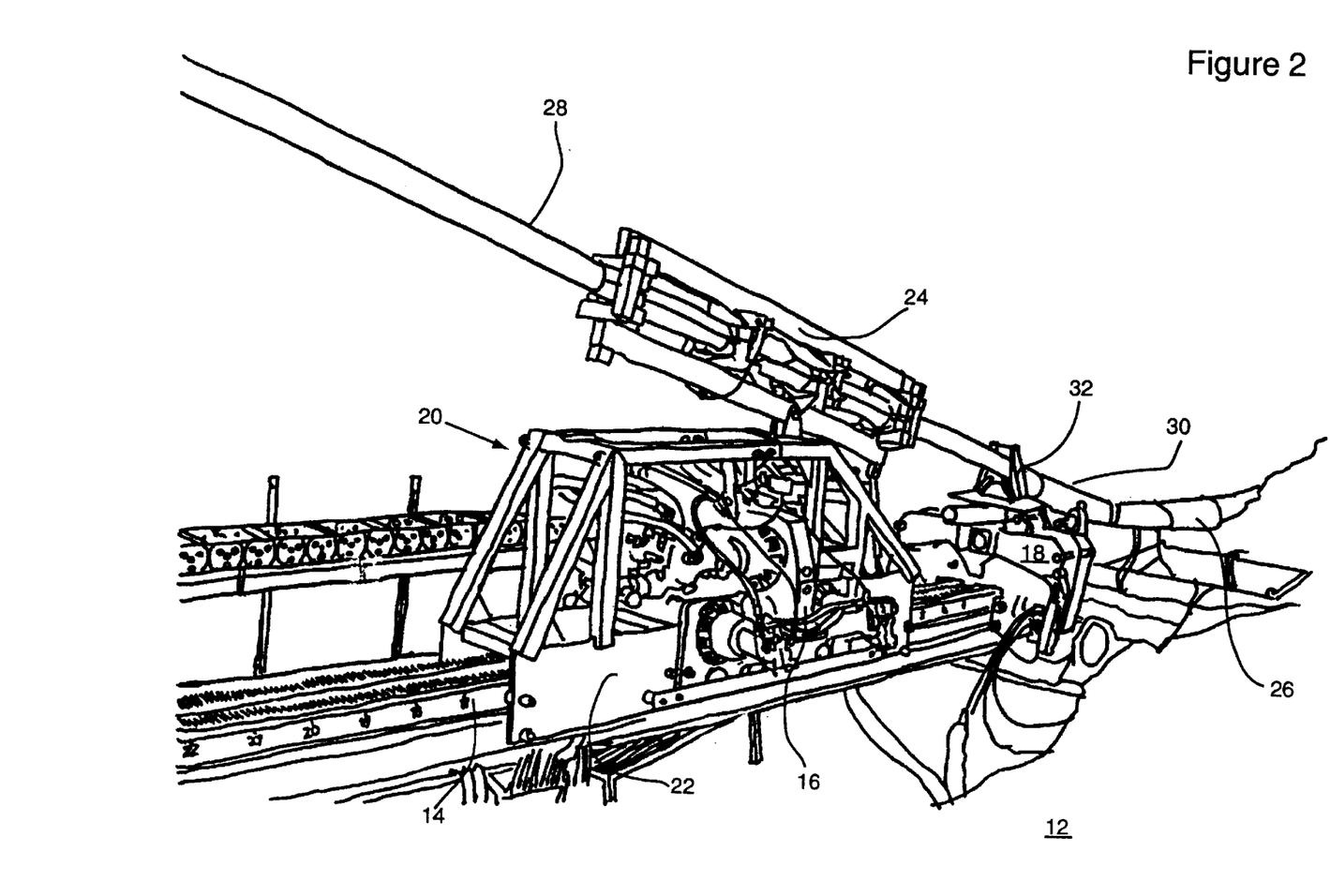
FIG. 2 is a perspective view of the apparatus for inserting, and removing, a flexible first material into a second material of the present invention.

Referring now to FIG. 2, the apparatus for inserting, and removing, a flexible first material into a second material 20 of the present invention is illustrated. The apparatus 20 includes carriage 22 and clamp 24. In a preferred embodiment, in cases where the resisting friction forces are high or the buckling strength of the flexible first material is low, apparatus 20 further includes receiver stiffener casing 26. As illustrated, carriage 22 is shown connected to drill 16 so that carriage 22 moves with drill 16 as drill 16 is moved along stationary track 14. FIG. 2 shows clamp 24 clamped around flexible pipe 28 with the leading end 30 of flexible pipe 28 already inserted into receiver stiffener casing 26 and therefore not visible. Further, the figure shows receiver stiffener casing 26 connected to rig vices 18, as will be disclosed and discussed more fully hereafter. Additionally, the figure shows front support 32 supporting flexible pipe 28 just prior to its entry into receiver stiffener casing 26. Finally, the figure illustrates receiver stiffener casing 26 extending from the ground 12 to meet flexible pipe 28. Again, in a preferred embodiment, where the resisting friction of the second material is low or the buckling strength of the flexible pipe 28 being pushed is high, no receiver stiffener casing 26 is required.

Figure 3:
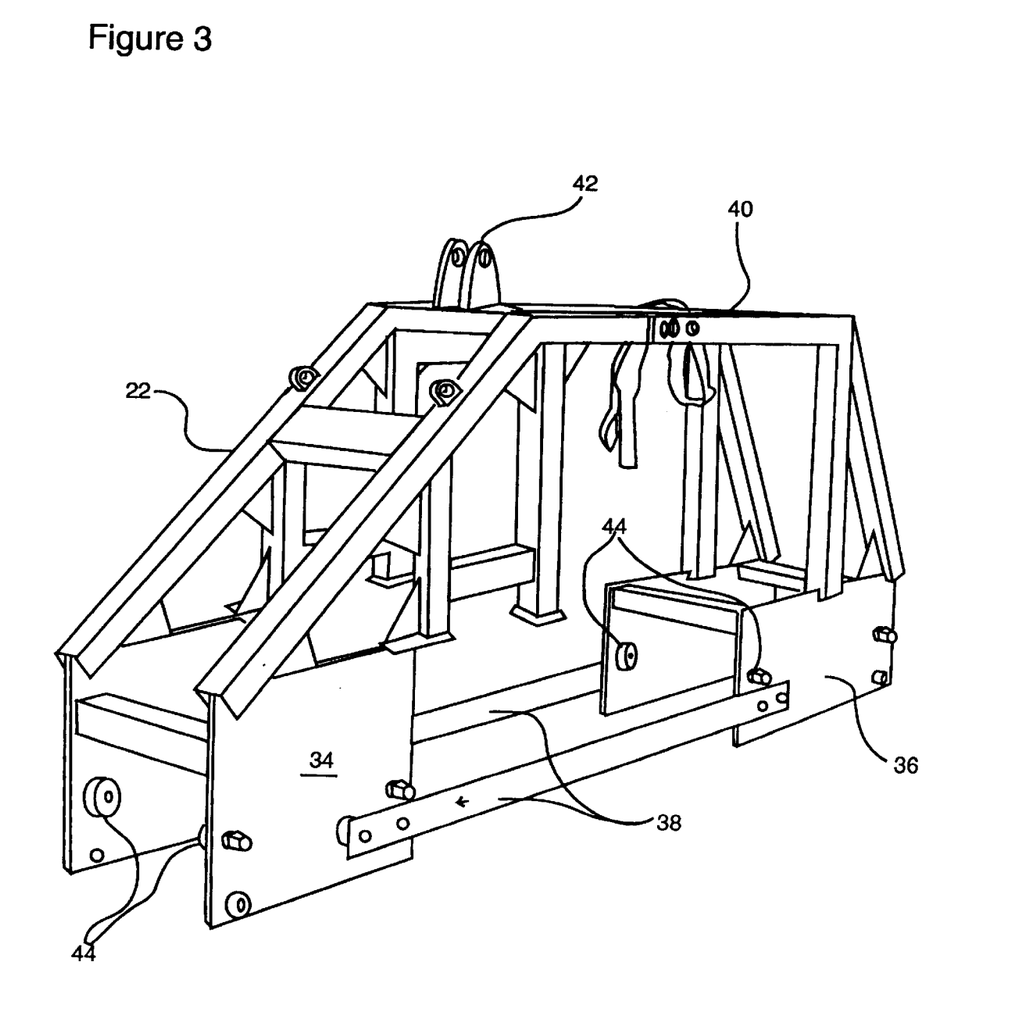
FIG. 3 is a perspective view of the carriage of the invention of FIG. 2.
Figure 4:
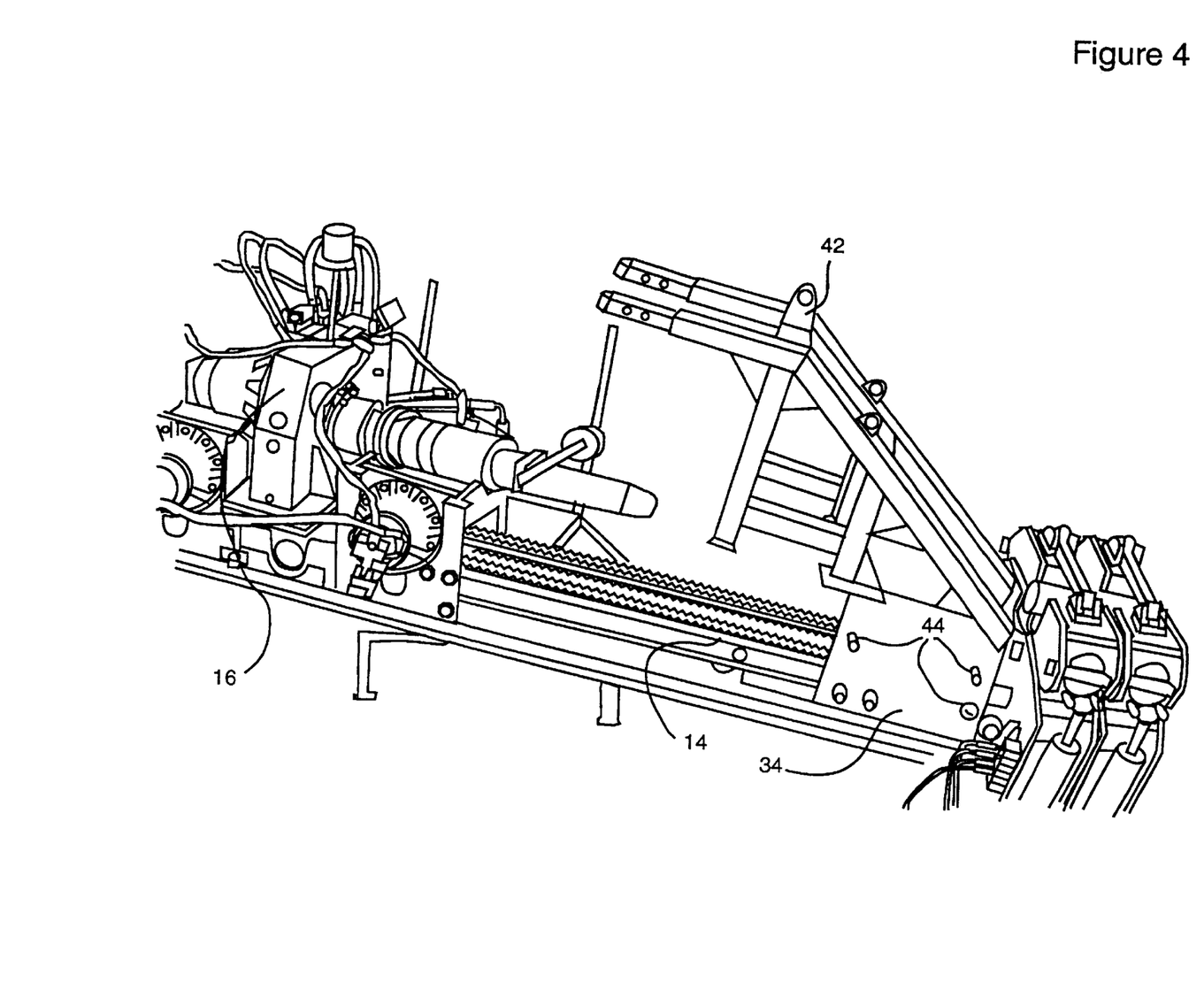
FIG. 4 is a perspective view of the forward half of the carriage of FIG. 3 being connected to the drill of the prior art slant drill rig illustrated in FIG. 1.
Figure 5:
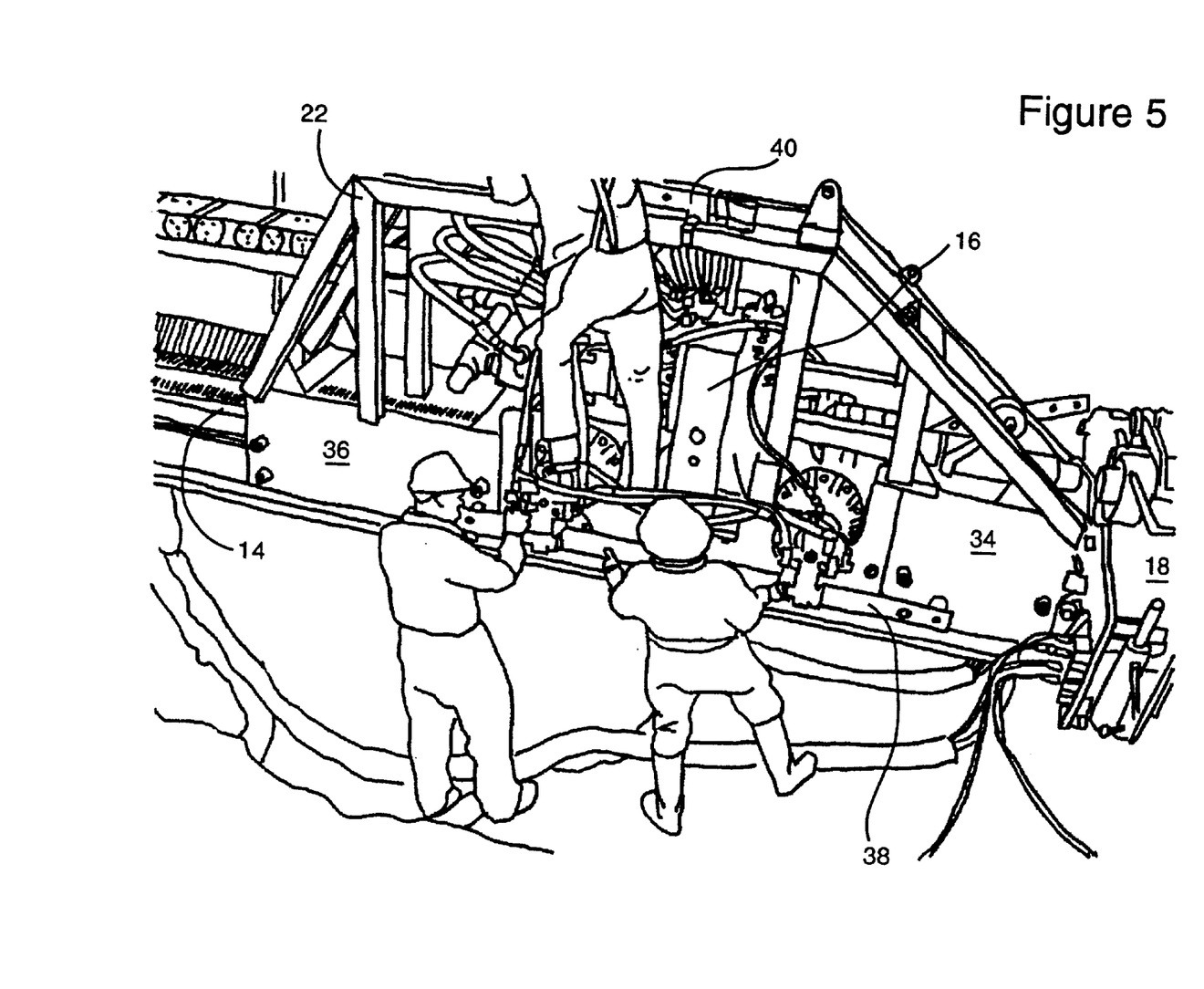
FIG. 5 is a perspective view of the aft half of the carriage of FIG. 3 connected to the drill of the prior art slant drill rig illustrated in FIG. 1 connected to the forward half of the carriage.

Referring now to FIGS. 3, 4, and 5, carriage 22 in a preferred embodiment is created in two separate parts, forward carriage 34 and aft carriage 36. Forward carriage 34 and aft carriage 36 are joined together by side ties 38 and lock pins 40. Also illustrated in the figures are clamp pivot pin 42 and rollers 44.

Referring now particularly to FIG. 4, forward carriage 34 is shown being placed on stationary track 14, prior to engagement with drill 16, so that rollers 44 engage stationary track 14. Referring to FIG. 5, aft carriage 36 is shown placed on stationary track 14 behind drill 16 and joined together with forward carriage 34 by means of side ties 38 and lock pins 40. As a result, movement of drill 16 necessarily causes carriage 22 to move in the same direction and at the same speed.

Figure 6:
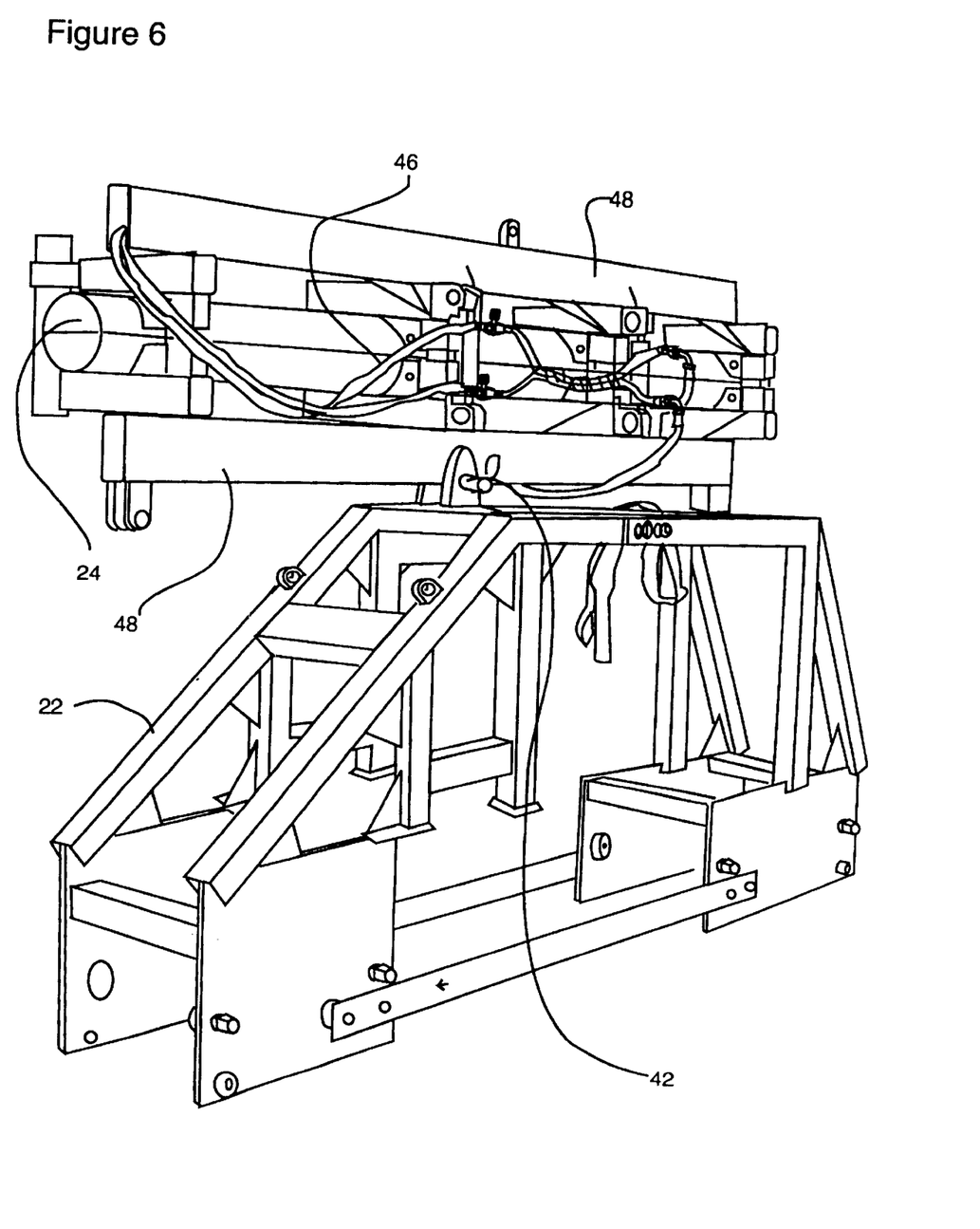
FIG. 6 is a perspective view of the clamp of the present invention connected to the carriage.

FIG. 6 shows clamp 24 connected to carriage 22 by clamp pivot pin 42. Also illustrated are clamp hydraulics 46 and clamp strong backs 48, as will be discussed more fully hereafter.

Figure 7:
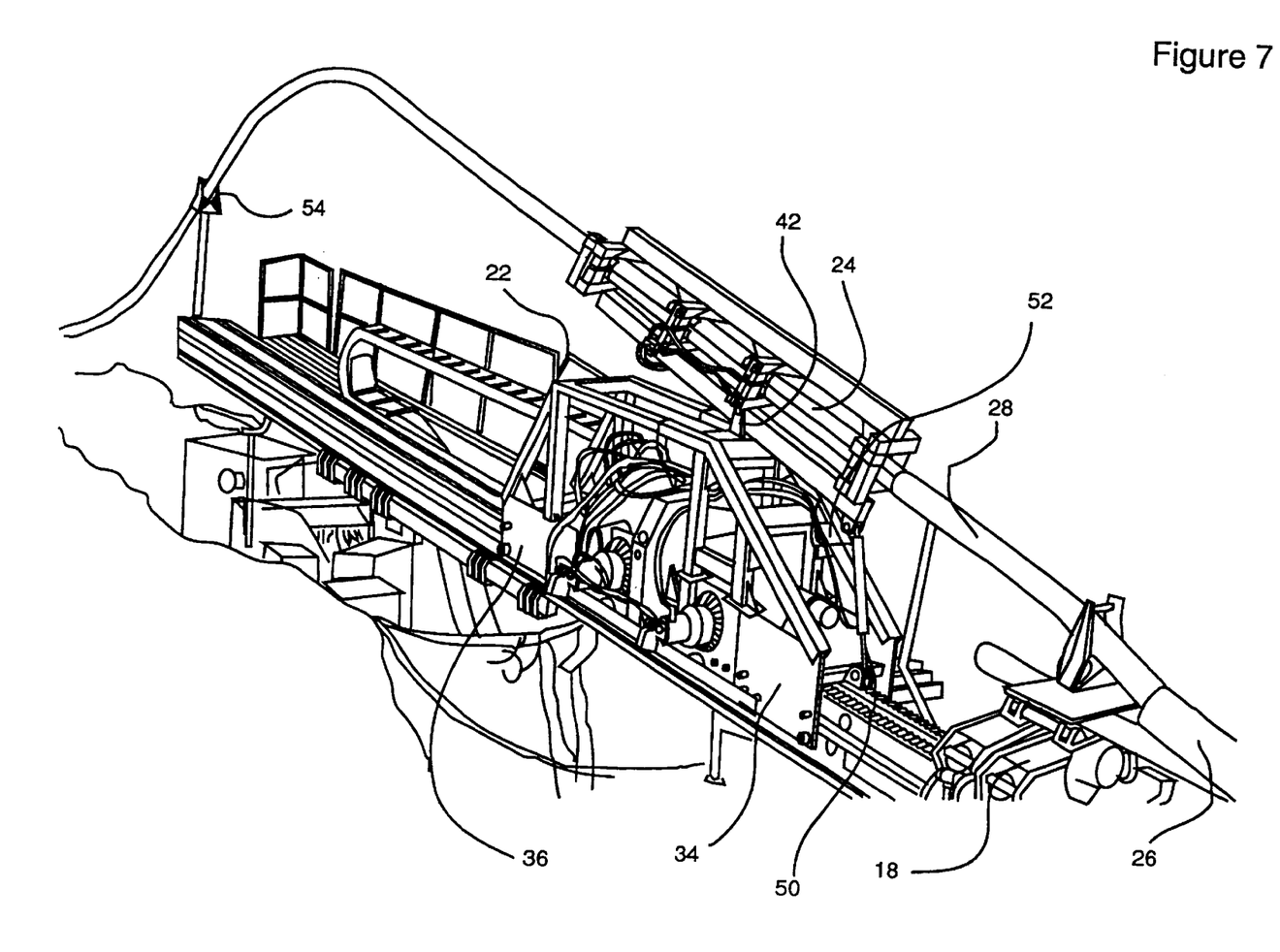
FIG. 7 is a perspective view of the present invention illustrating the clamp in the clamped position, the carriage moved towards the leading end of the flexible pipe, the axial tilt device in the retracted position and front and rear supports.

FIG. 7 shows carriage 22 in the forward position, close to rig vices 18 and with axial tilt device 50 in a retracted position. The axial tilt device 50 is connected to carriage 22. In this illustration, axial tilt device 50 is connected to the front 52 of the clamp 24. Because of clamp pivot pin 42, when axial tilt device 50 is in the retracted position, as illustrated, clamp 24 is drawn down. Axial tilt device 50 thereby gives an operator of apparatus 20 the ability to control the alignment of clamp 24, and thereby flexible pipe 28, as flexible pipe 28 is introduced to, or removed from, the ground 12 and/or receiver stiffener casing 26, among other things, as will be discussed more fully hereafter. The figure also shows rear support 54.

Figure 8:
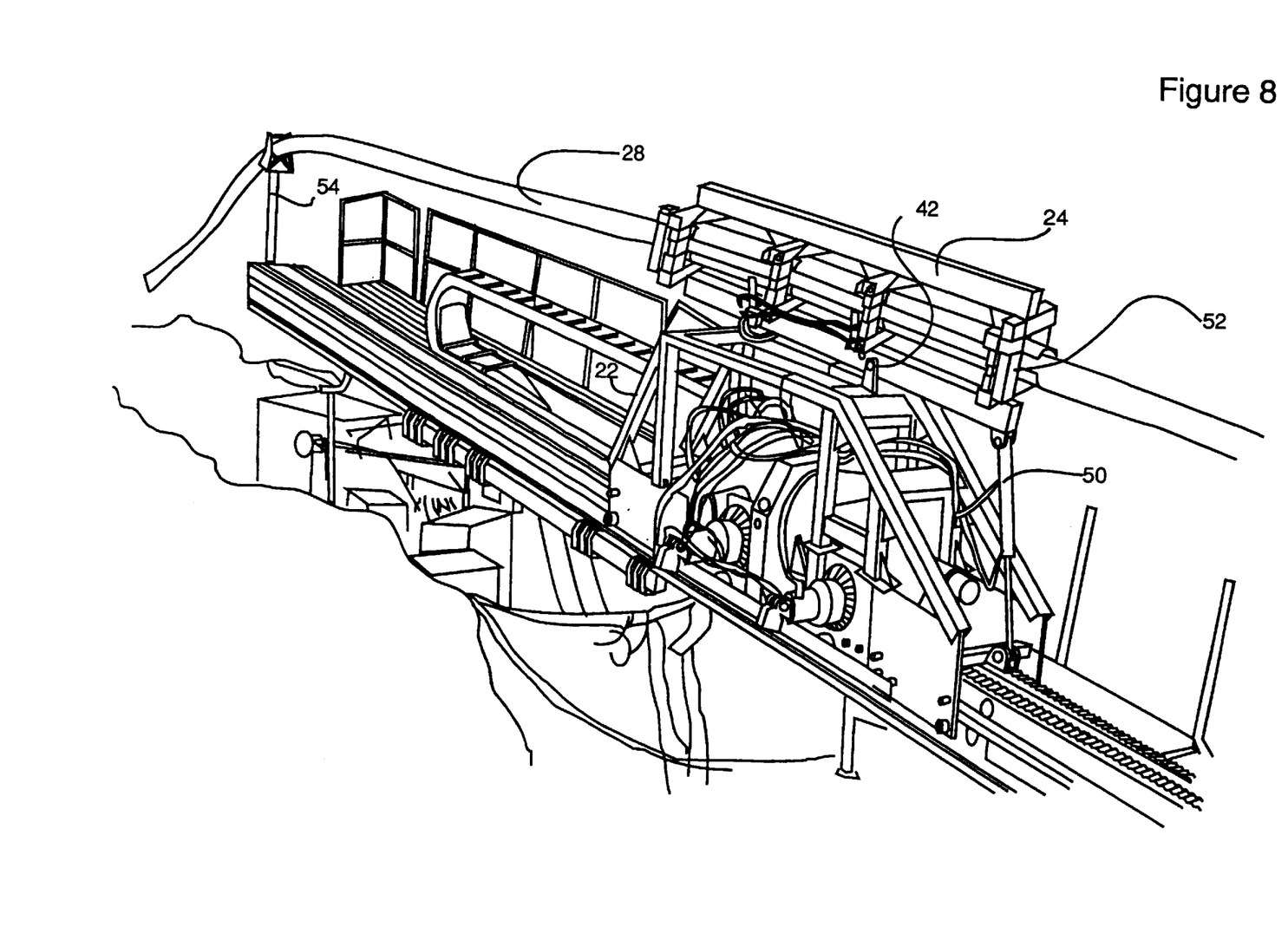
FIG. 8 is a perspective view of the present invention illustrating the clamp in the open position, the carriage moved away from the leading end of the flexible pipe, and the axial tilt device in the extended position.

Referring now to FIG. 8, carriage 22 is shown moving away from leading end 30 of flexible pipe 28 and rig vices 18, as drill 16 is moved rearwardly along stationary track 14 toward rear support 54. Axial tilt device 50 is shown in the extended position and clamp 24 is shown in the open position, as will be discussed more fully hereafter. Importantly, because axial tilt device 50 is in the extended position as shown in FIG. 8, clamp 24 is caused to rotate around clamp pivot pin 42 until the centerline of clamp 24 is concurrent, essentially, with the centerline of flexible pipe 28 as it extends from rear support 54.

Figure 9:
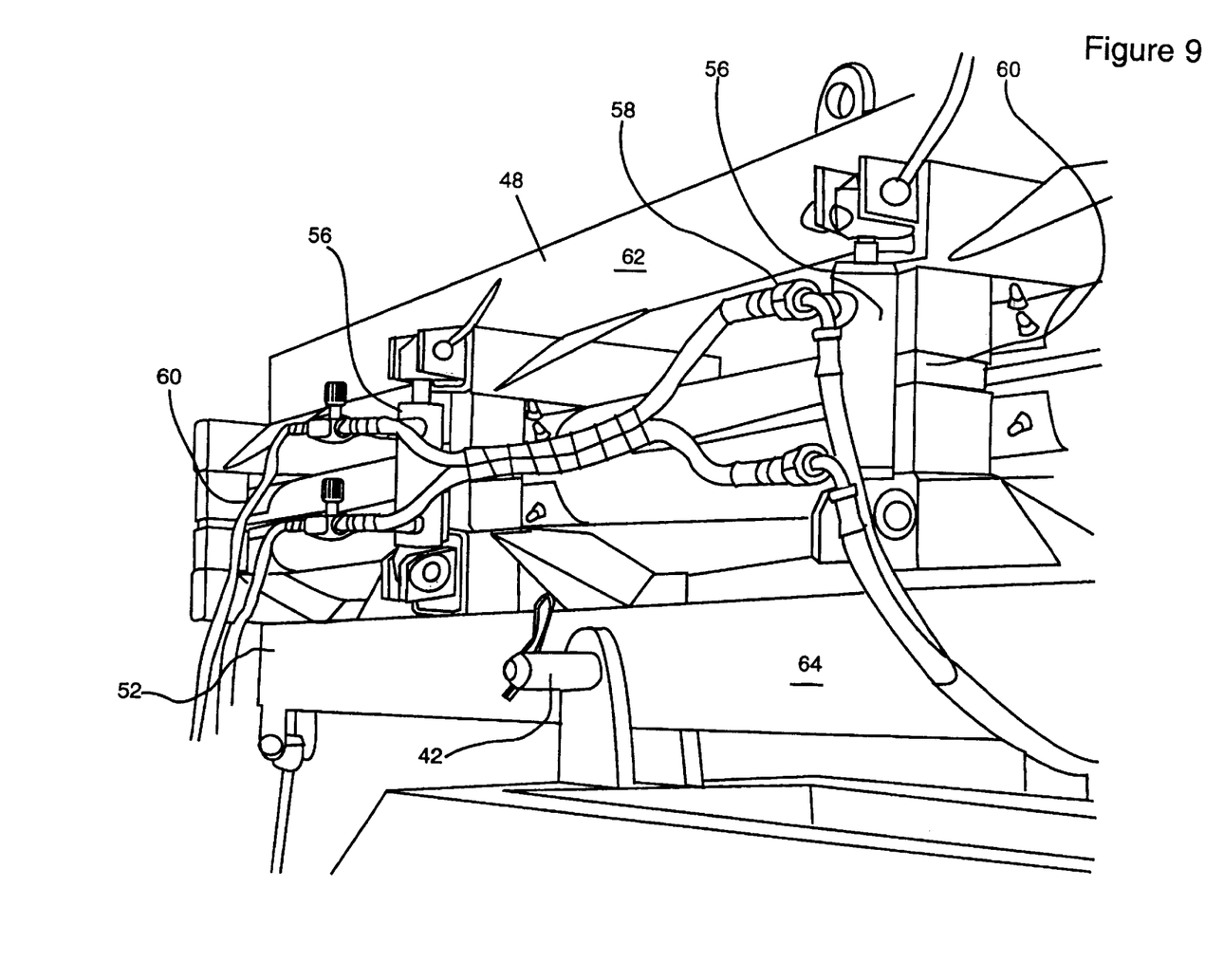
FIG. 9 is a perspective view close-up of the clamp of the present invention.

Referring now to FIG. 9, a close-up of clamp 24 illustrates one side of the clamp hydraulics 46 of clamp 24. In the figure, two hydraulic cylinders 56 are connected to two hydraulic lines 58 and operate by connection to the hydraulic system of the prior art slant drill rig 10. Identical hydraulic cylinders 56 and hydraulic lines 58 are attached on the opposite side (not shown) of clamp 24. While the apparatus 20 of the present invention is a motorized stand-alone entity in a preferred embodiment, in another preferred embodiment it is configured to be attached to the existing slant drill rigs 10 known in the art and to utilize the drill rig's existing motive and hydraulic powers.

FIG. 9 also illustrates locks 60 designed to join clamp 24 together when in the closed/clamped position. Locks 60 may be of any type now known or hereafter developed. The illustrated locks 60 include a receiver and a locking pin. When joined together, the receiver accepts the locking pin and the clamp 24 is locked together and prevented from axial movement relative to each other. Because carriage 22, clamp 24 and flexible pipe 28 move axially along stationary track 14 in operation, it is important that locks 60 prevent axial displacement of clamp upper half 66, relative to clamp lower half 68 or otherwise allowing the halves to move axially when in the clamped position.

Also illustrated in FIG. 9 is clamp strong back 48. In a preferred embodiment, clamp strong back 48 includes upper strong back 62 and lower strong back 64. Either alone or together, upper strong back 62 and lower strong back 64 add significant rigidity to clamp 24 and, thereby, to the section of flexible pipe 28 contained by clamp 24. The length and size of strong back 48 and clamp 24 are determined by known calculations involving the weight of material to be pushed or pulled by the apparatus 20 and the coefficients of friction needed to do so. These calculations are well within the capabilities of persons of ordinary skill in the art.

Figure 10:
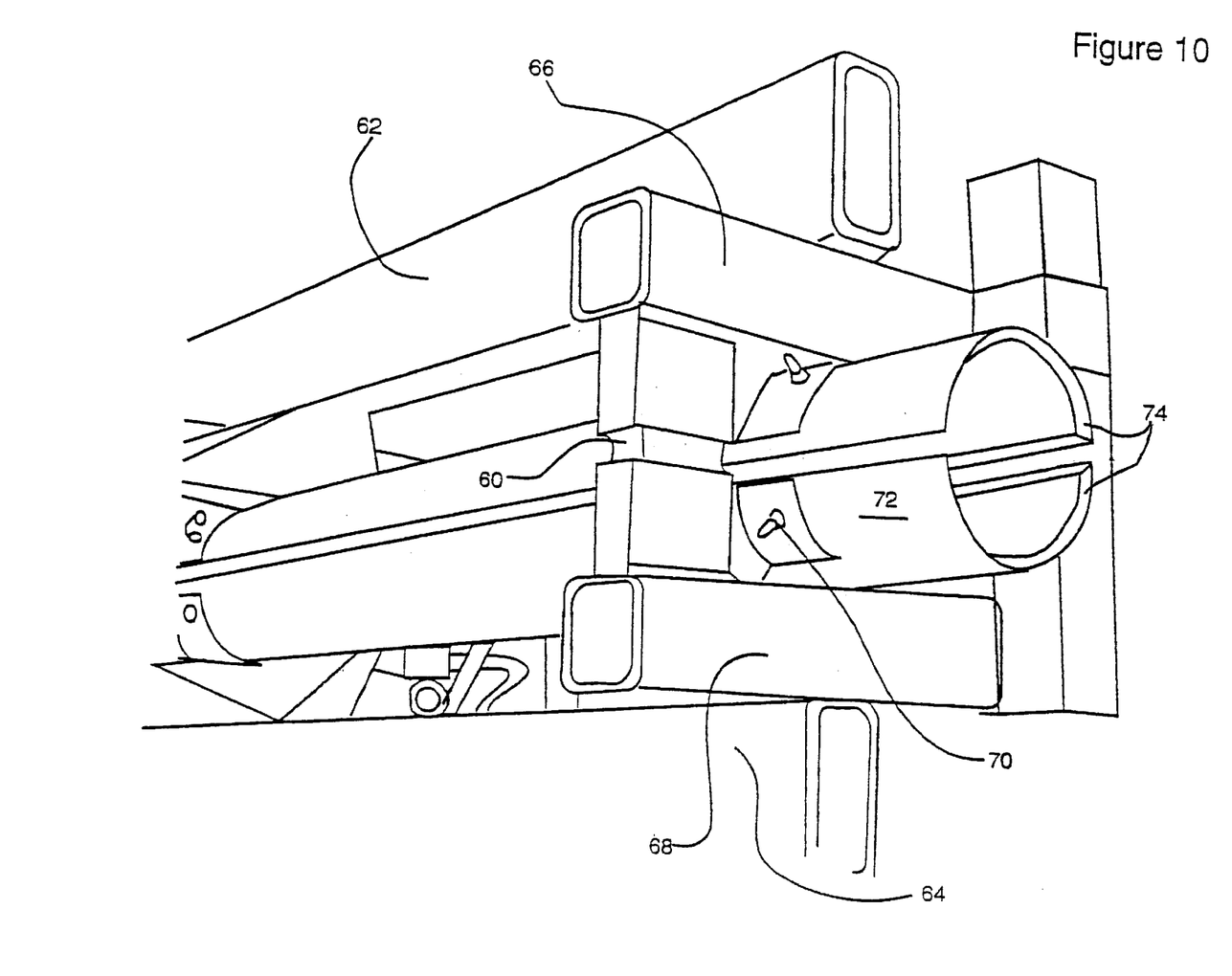
FIG. 10 is a further perspective view close-up of the clamp of the present invention.

FIG. 10 is a close-up of clamp 24 illustrating a preferred embodiment of clamp 24 wherein clamp 24 is divided in half and includes clamp upper half 66 and clamp lower half 68. In a preferred embodiment, clamp 24 is divided in half horizontally along its longitudinal length, as illustrated in all the drawings. The horizontal division provides better access to clamp 24 when flexible pipe 28 is first introduced into the clamp 24. Also, the division allows clamp 24 to be moved easily along the length of flexible pipe 28 in the open position. Still further, the horizontal division helps keep flexible pipe 28 properly oriented within clamp 24 whereas a vertical division would allow the flexible pipe 28 to bend upward and escape the clamp 24.

Figure 11:
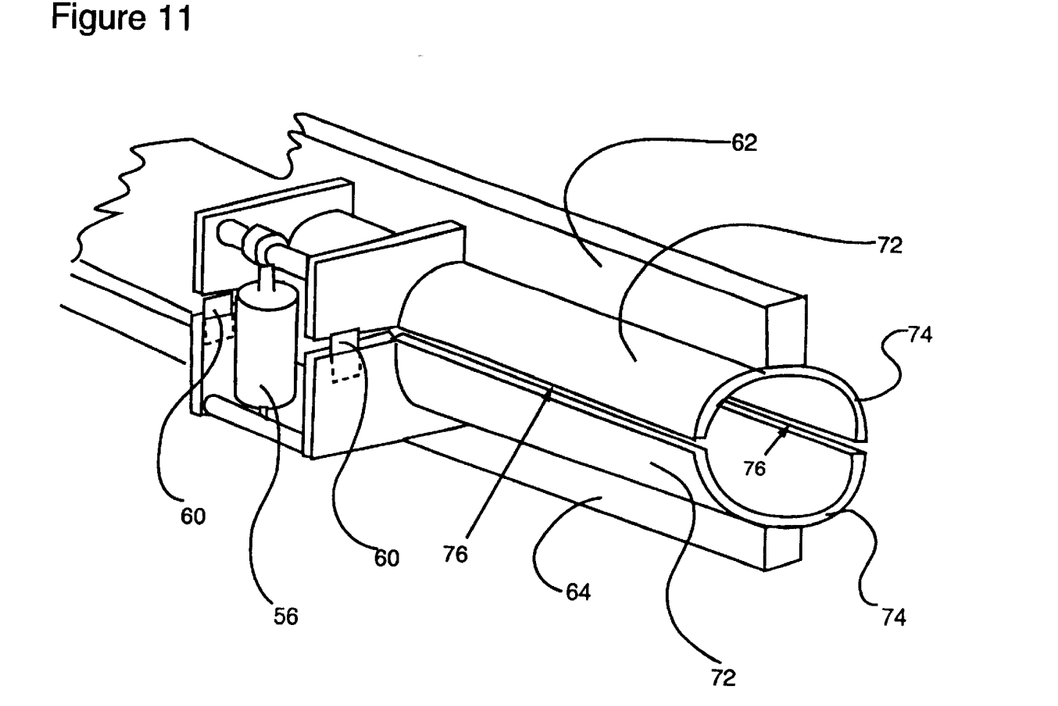
FIG. 11 is a perspective view of a preferred embodiment of the clamp of the present invention.

In a preferred embodiment, clamp 24 includes outer stiffener shell 70 and inner liner 72. Outer stiffener shell 70 adds rigidity to clamp 24 and may cover portions of inner liner 72, as shown in FIG. 10, or may run the entire length of inner liner 72, as illustrated in FIG. 11. In a preferred embodiment inner liner 72 is made of material that is the same as, and/or softer than, the flexible first material that is to be inserted into a second material. For best results, the inner liner 72 is made of material that is less rigid than, or is the same rigidity as, the pipe to be pushed. In a further preferred embodiment, therefore, inner liner 72 is made of HDPE plastic, the same as the HDPE plastic flexible pipe 28 being inserted into the ground 12, for example. FIG. 10 also illustrates a preferred embodiment of the present invention wherein the leading edge 74 of inner liner 72 is beveled. Both of these embodiments ensure that inner liner 72 does not damage flexible pipe 28 as clamp 24 is operated and pipe 28 is moved through clamp 24.

FIG. 11 illustrates another preferred embodiment of the present invention whereby a single hydraulic cylinder 56 operates the opening and closing of clamp 24. Also, as mentioned above, FIG. 11 illustrates a preferred embodiment of the present invention whereby outer stiffener shell 70 fully encompasses inner liner 72 along the entire length of inner liner 72. Additionally, the figure illustrates a preferred embodiment of the present invention whereby a gap 76 is present along the entire longitudinal length of clamp 24 when clamp 24 is in the closed position. Because clamp hydraulics 46 provide for progressive grip pressure i.e. pressure is maintained constantly or may be gradually increased as desired, gap 76 ensures that the clamp upper half 66 and clamp lower half 68 never bind against each other and resist closing.

Figure 12:
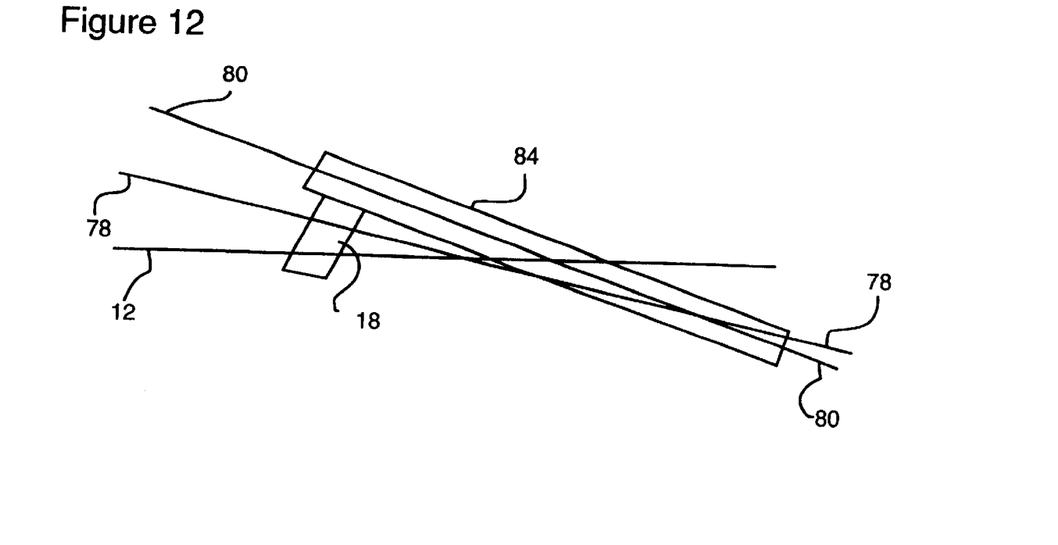
FIG. 12 is a side schematic view illustrating the relative position of the casing of the present invention with the centerline of a drill pipe of prior art.

Referring now to FIG. 12, it illustrates the various angles with which applicant's invention is concerned. To begin with, drill pipe centerline 78 represents the line along which a borehole has been drilled in ground 12 and into which flexible pipe 28 is to be inserted. Receiver stiffener casing 26 centerline 80 illustrates the fact that casing 26 is approaching the borehole at a greater angle. Again, in a preferred embodiment, receiver stiffener casing 26 extends from the ground 12 toward the apparatus 20. At some point, receiver stiffener casing 26 centerline 80 is coincident with the drill pipe centerline 78 so as to enable the insertion of flexible pipe 28 into the borehole. In the preferred embodiment without casing 26, flexible pipe 28 is still inserted into ground 12 essentially along the line/path indicated as centerline 80.

Figure 13:
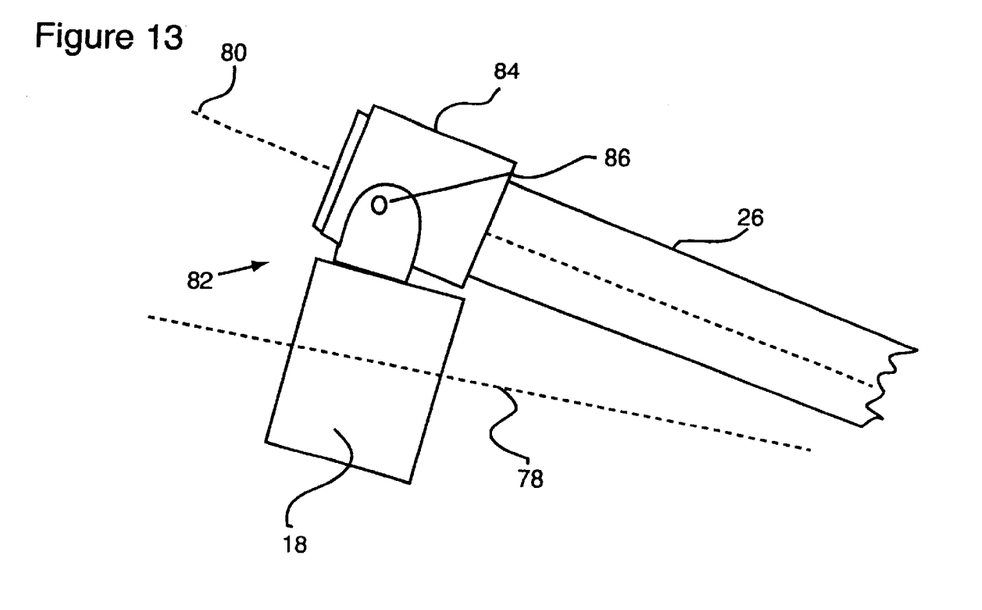
FIG. 13 is a side schematic view of the casing connection of the present invention.

Referring now to FIG. 13, stationary track connection 82 is illustrated. In a preferred embodiment, stationary track connection 82 is connected to receiver stiffener casing 26 by means of a locating ring clamp 84 and locating ring clamp pivot 86. In a preferred embodiment, locating ring clamp pivot 86 is secured to rig vices 18, or some other stationary part of slant drill rig 10. As its name implies, locating ring clamp 84 locates receiver stiffener casing 26 while allowing receiver stiffener casing 26 to pivot within clamp pivot 86. Clamp pivot 86 is used to ease the installation of casing 26. During operation of the present invention, clamp pivot 86 preferably is locked in position.

Figure 14:
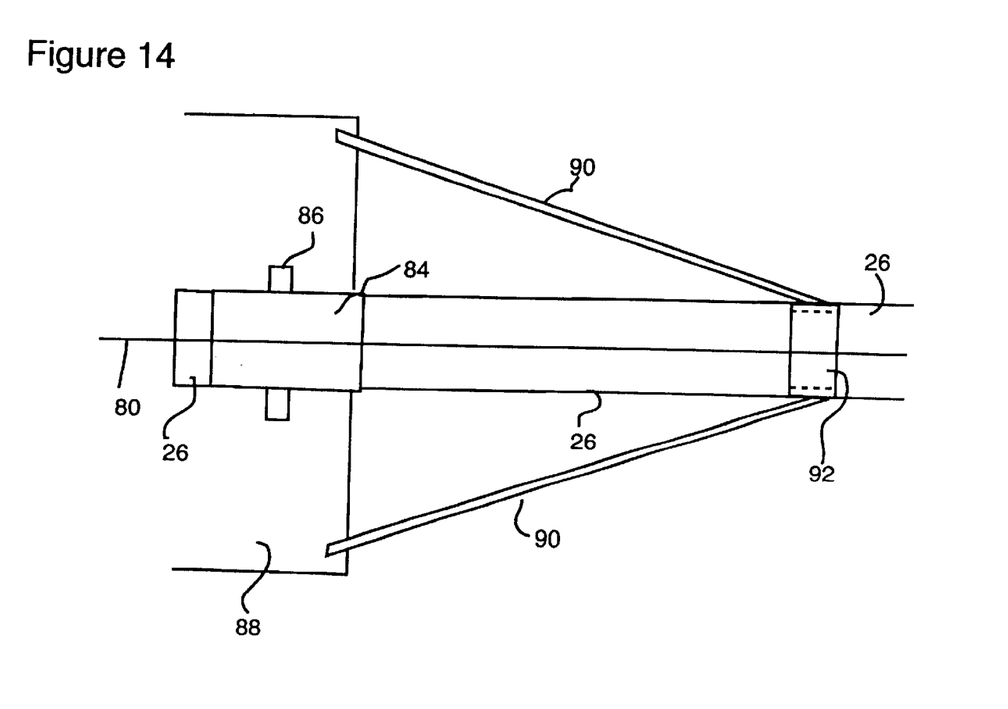
FIG. 14 is a top schematic view of the casing connection of the present invention.

FIG. 14 is a top view illustrating locating ring clamp 84 and locating ring clamp pivot 86, in this instance secured to drill rig 10 front plate dead foot 88 which is anchored to the ground 12. In any event, another preferred embodiment of the invention is disclosed whereby struts 90 are connected on one end to stationary track 14 by means of connection to front plate dead foot 88. The opposite ends of struts 90 are connected to a receiver stiffener casing clamp ring 92 which is securely connected to receiver stiffener casing 26. Struts 90 handle loads generated during insertion and withdrawal of pipe 28.

The advantages of the present invention can be better understood by reference to the first described example of the prior art approach used to install flexible pipe in a borehole. To begin with, the apparatus 20 of the present invention enables a user to dispense with the time and cost involved for creating male/female joints. Instead, a one thousand foot length of flexible pipe is created by welding forty foot joint lengths together directly. This cuts the number of welds in half, from fifty to twenty-five, which in itself is an extraordinary time and cost savings. More importantly, the direct welds actually result in pipe that is stronger at the weld increasing the structural integrity of the pipe and decreasing the likelihood of leaks during insertion and withdrawal. In accordance with the present invention, a single, continuous welded flexible pipe 28 may be created in one day, another fifty percent time savings over the prior art. Additionally, because joints have not been created that are larger than the outside diameter of the flexible pipe 28, no additional borehole reaming is required, saving a still further full ten days of rig time. Finally, because a single length of continuous flexible pipe 28 has been created, installation of one thousand feet of flexible pipe 28 takes one half an hour as opposed to the sixteen hours required in the prior art.

In light of the discussion above, some of the more obvious advantages of the apparatus 20 of the present invention over the prior art are:

A continuous pipeline can be installed using the existing drilling rig 10 in conjunction with apparatus 20 while leaving the drilling rig 10 in the exact location as during drilling a borehole.

Large compressive loads can be applied to flexible pipe 28 without damage.

Pipeline can be installed and removed very quickly.

Clamp 24, when griping flexible pipe 28, adds rigidity to flexible pipe 28 and causes no damage or marking on flexible pipe 28 thus maintaining the pipeline integrity.

Operational control of clamp 24 is simple; mainly two functions:
  a) clamp open; clamp closed, with progressive grip pressure, with hydraulic cylinder pressure adjustable from 0 to 4000 psi, for example; and
  b) clamp axial tilt, from horizontal to axial alignment with the borehole or receiver stiffener casing 26 i.e. forward end down.

In operation when circumstances require it, referring again to FIG. 13, receiver stiffener casing 26, in a preferred embodiment is slipped through locating ring clamp 84 mounted on the top of a rig vices 18, for example. Locating ring clamp 84 is freely pivoted about a horizontal axis in clamp pivot 86 which is rigidly attached to the top of rig vices 18. In another preferred embodiment, as illustrated in FIG. 14, clamp ring 92 is securely attached to receiver stiffener casing 26. One end of struts 90 is connected to front plate dead foot 88 which is anchored to the ground 12. The other end of struts 90 is connected to clamp ring 92. The attachments by struts 90 may be hydraulically tensioned to maintain the receiver stiffener casing 26 rigidly attached to drill rig 10 and held in the entry to the borehole in ground 12.

When needed, receiver stiffener casing 26 is approximately 1 ½ times the diameter of flexible pipe 28 and the outside diameter of receiver stiffener casing 26 is just slightly smaller than the borehole diameter in ground 12. Preferably, receiver stiffener casing 26 is a medium/thin wall, steel.

Forward carriage 34 is located in front of drill motor 16 and is free to slide along the beam of stationary track 14 too. Carriage 22 has rollers 44 which reduce friction, provide accurate location, and retain apparatus 20 on stationary track 14.

Aft carriage 36 is constructed to operate as the forward carriage 34, but is located opposite from forward carriage 34 with drill 16 in between. The two carriages are joined together by lock pins 40 in the top structural members of carriage 22 and side ties 38 attached to the lower structural members of carriage 22, approximately in line with rollers 44.

In a preferred embodiment, clamp 24 is comprised of two halves, clamp upper half 66 and clamp lower half 68, of a cylindrical outer stiffener shell 70, split axially along a horizontal plane. The two halves of clamp 24 are opened and closed by hydraulic cylinders 56 on both sides, which are pressure balanced so that they apply equal force. In a preferred embodiment, the clamp 24 length is eight to twenty-five times the diameter of the flexible pipe 28 so that the force generated by the clamp pressure is sufficient to provide a means of overcoming both the frictional force between the flexible pipe 28 and the borehole in ground 12 and the frictional force required to pull the assembled pipeline over the ground 12 surface behind drill rig 10. The clamping force can then be small enough to avoid crushing flexible pipe 28.

In a preferred embodiment an inner liner 72 is provided which is made up of the same material as the flexible pipe 28. The leading edge 74 of inner liner 72 is beveled/tapered to provide a smooth entry and exit for flexible pipe 28 into and out of clamp 24.

In a further preferred embodiment, clamp 24, in the closed position, has a small gap 76 along the length of clamp 24. Further, the internal diameter of clamp 24 should be nominally equal to the outside diameter of the flexible pipe 28.

Importantly, the longitudinal axis of clamp 24 must be stiff in order to ensure uniform distribution of the compressive closing loads. In a preferred embodiment, this is achieved by upper strong back 62 and lower strong back 64 which also provide structure for attachment of hydraulic cylinders 46.

Locks 60, made up of opposed pins and sockets, for example, are incorporated on both sides of clamp 24 and provide a means of transferring the axial loads between the upper clamp half 66 and lower clamp half 68 and preventing the halves from been misaligned during push or pull.

Once again, it is preferential to have clamp 24 split along a horizontal plane because the clamp 24 surfaces contain the deflected radius of flexible pipe 28 when clamp 24 is released or in the open position. If clamp 24 were split along a vertical axial plane, flexible pipe 28 would have a tendency to move out of the upper clamp split when clamp 24 is open. This would require additional pipe constraints on the top of clamp 24.

It is preferential that clamp pivot pin 42 is connected to lower strong back 64 and is fitted so that the lower strong back 64 has a larger/longer section to the rear of clamp pivot pin 42. This ensures an uneven weight distribution which causes clamp 24 to rotate about clamp pivot pin 42 and settle to the rear of clamp 24 in a horizontal position.

When open, clamp 24 is opened to approximately 1 ½ times the flexible pipe 28 diameter so as to allow clamp 24 to slide easily in either direction along flexible pipe 28. In a preferred embodiment a rear support 54 is mounted at the rear end of drill rig 10. Rear support 54 includes rollers or friction reducing surfaces. Importantly, the center axis of the rear support 54 is the same height as the clamp 24 centerline when the longitudinal axis of clamp 24 is parallel to stationary track 14 (see FIG. 8, for example). In cases where resistance is low and/or flexible pipe 28 stiffness is high, front support 32 is used to guide and support flexible pipe 28 into the borehole without use of receiver stiffener case 26. In this case, front support 32 minimizes lateral, side to side, and to some degree vertical, up and down, movement of flexible pipe 28.

Axial tilt device 50, in a preferred embodiment, is attached between the lower strong back 64 of clamp 24 and either the front or rear of carriage 22. Axial tilt device 50 is used to change the angular alignment between the drill rig 10 (stationary track 14) beam axis and the clamp 24 axis. The relative angle between these axis is in the range of zero degrees to thirty degrees. By means of axial tilt device 50, clamp 24 is tilted downward as the clamp 24 is moved forward along stationary track 14, for example, and then tilted up as the clamp 24 is moved rearward. In use, an operator observes the operation of apparatus 20 and adjusts axial tilt device 50 and clamp 24 as necessary to keep flexible pipe 28 axially aligned with the borehole, or, if used, the receiver stiffener casing 26, as flexible pipe 28 is inserted into the borehole in ground 12.

To insert flexible pipe 28 into the borehole in ground 12, once a long continuous section of flexible pipe 28 has been previously welded, approximately fifteen feet of flexible pipe 28 is pulled through rear support 54. Clamp 24 is opened and the carriage 22 is moved rearward, entering flexible pipe 28 into clamp 24. Clamp 24 is closed when the leading end 30 of flexible pipe 28 is through the clamp 24. At that point, carriage 22 is moved forward, bringing the leading end 30 of flexible pipe 28 into the borehole and/or receiver stiffener casing 26. At the same time, axial tilt device 50 tilts the front of clamp 24 down so as to align the flexible pipe 28 in the borehole or receiver stiffener casing 26, in the case where receiver stiffener casing 26 is necessary. At that point, clamp 24 is opened, carriage 22 moved rearwards, and clamp 24 is tilted, by axial tilt device 50, so as to align the rear of clamp 24 with rear support 54 and flexible pipe 28 at that location.

The process is continued by closing clamp 24, moving carriage 22 forward and pushing a new section of flexible pipe 28 into the borehole/receiver stiffener casing 26 all while tilting clamp 24 to control the shape of flexible pipe 28 distortion caused by compressive forces. If the compressive force is large enough that the deflection cannot be controlled, the operator stops the forward movement. The clamp 24 is opened and carriage 22 is moved to within a few feet of the entry to the borehole or receiver stiffener casing 26. Compressive loads due to friction in the borehole can be sufficient to induce buckling in the pipe 28. Those of ordinary skill in the art know that by means of basic "buckling" analysis, the buckling load may be calculated. The buckling load, in general, is proportional to the square of the unsupported, "exposed", pipe length between the forward end of clamp 24 and the entry to the borehole/receiver stiffener casing 26. If the length of the exposed pipe, for example, is reduced from thirty feet to five feet, the buckling load increases by multiples of thirty-six times. Thus, during periods when the compressive loads are high on flexible pipe 28, as may be easily observed by a user observing the shape of flexible pipe 28, clamp 24 is moved to within a short distance from the entry to the borehole or receiver stiffener casing 26 before being placed in the clamped position and the insertion process continued. In combination then, in a preferred embodiment, the flexible pipe 28 is contained within the borehole or receiver stiffener casing 26 and also within clamp 24. As a result, flexible pipe 28 behaves as having an encased support at both ends of flexible pipe 28 which changes the mode of buckling by greatly increasing the load at which buckling becomes an issue.

The process of removing flexible pipe 28 from a borehole in ground 12 is the reverse of the process described above. So long as the removed flexible pipe 28 is taken away from the rear of rig 10, flexible pipe 28 may be removed as quickly as apparatus 20 can be operated.

While the present invention has been disclosed in connection with the preferred embodiment thereof, it should be understood that there may be other embodiments which fall within the spirit and scope of the invention as defined by the following claims.

What is claimed is:

1. An apparatus for inserting and removing a flexible first material into a second material comprising:
   a) a moveable carriage;
   b) an adjustable clamp connected to said moveable carriage, adjustable between an open position and a clamped position on said flexible first material;
   c) wherein said flexible first material has an exterior shape and the adjustable clamp further comprises two halves conformed to said exterior shape of said flexible first material; and
   d) wherein said two halves further comprise an outer stiffener shell and an inner liner.

2. The apparatus of claim 1 further comprising a receiver stiffener casing configured to receive and support said flexible first material as said flexible first material is inserted into and removed from said second material.

3. The apparatus of claim 1 further comprising a stationary track for supporting said moveable carriage.

4. The apparatus of claim 1 wherein said inner liner has beveled leading edges.

5. The apparatus of claim 1 wherein said adjustable clamp is hydraulically operable and provides progressive grip pressure in said clamped position.

6. The apparatus of claim 1 wherein said adjustable clamp further comprises a lock for joining said two halves together in said clamped position.

7. The apparatus of claim 1 wherein said two halves are split horizontally.

8. The apparatus of claim 1 wherein said two halves are separated by a longitudinal gap when in said clamped position.

9. The apparatus of claim 1 further comprising an axial tilt device connected to said adjustable clamp.

10. The apparatus of claim 1 further comprising at least one strong back connected to said adjustable clamp.

11. The apparatus of claim 10 further comprising a pair of oppositely positioned strong backs connected along longitudinal lengths of said adjustable clamp.

12. The apparatus of claim 1 wherein said inner liner is comprised of material the same as said flexible material.

13. The apparatus of claim 1 wherein said flexible first material is HDPE pipe.

14. The apparatus of claim 1 wherein said second material is ground with a borehole into which said flexible first material is inserted.

15. The apparatus of claim 1 further comprising at least one support for said flexible first material.

16. The apparatus of claim 15 wherein said at least one support is connected in front of said moveable carriage and before said second material.

17. The apparatus of claim 15 wherein said at least one support is connected in front of said moveable carriage in the direction of movement of said moveable carriage.

18. The apparatus of claim 1 wherein said flexible first material is selected from a group of materials including: plastic pipe, metal pipe and well screens.

19. The apparatus of claim 1 wherein said adjustable clamp is pivotally connected to said moveable carriage.

20. An apparatus for inserting and removing a flexable first material into a second material comprising:
   a) a movable carriage;
   b) an adjustable clamp connected to said moveable carriage, adjustable between an open position and a clamped position on said flexible first material;
   c) a receiver stiffener casing configured to receive and support said flexible first material as said flexible first material is inserted into and removed from said second material; and
   d) a stationary track connection for connecting said receiver stiffener casing to a stationary track.

21. The apparatus of claim 20 wherein said stationary track connection further comprises a locating ring clamp and a clamp pivot.

22. The apparatus of claim 20, wherein said stationary track connection further comprises struts connected to said stationary track extended to connect with a receiver stiffener casing clamp ring connected to said receiver stiffener casing.

23. An apparatus for inserting and removing a flexible first material into a second material comprising:
   a) a movable carriage;
   b) an adjustable clamp connected to said movable carriage, adjustable between an open position and a clamped position on said flexible first material;
   c) a receiver stiffener casing configured to receive and support said flexible first material as said flexible first material is inserted into and removed from said second material; and
   d) wherein said receiver stiffener casing extends from said second material.

24. In a slant drill rig with a stationary track and a moveable drill for drilling a borehole in the ground, a push-pull apparatus for inserting and removing cylindrical tubing in the borehole comprising:
   a) a carriage attached to the moveable drill; and
   b) an adjustable clamp connected to the carriage, adjustable between an open position and a clamped position on the cylindrical tubing.

25. The apparatus of claim 24 further comprising a receiver stiffener casing configured to receive and support the cylindrical tubing as the cylindrical tubing is inserted into and removed from the borehole.

26. The apparatus of claim 25 further comprising a drill rig connection for connecting the receiver stiffener casing to the slant drill rig.

27. The apparatus of claim 26 wherein the drill rig connection comprises a locating ring clamp and a clamp pivot.

28. The apparatus of claim 26 wherein the drill rig connection comprises struts connected to the drill rig extended to connect with a receiver stiffener casing clamp ring connected to the receiver stiffener casing.

29. The apparatus of claim 25 further comprising at least one strong back connected to the adjustable clamp.

30. The apparatus of claim 29 further comprising a pair of oppositely positioned strong backs connected along longitudinal lengths of the adjustable clamp.

31. The apparatus of claim 25 wherein the receiver stiffener casing extends from the borehole.

32. The apparatus of claim 24 wherein the adjustable clamp further comprises two halves conformed to the dimensions of the exterior of the cylindrical tubing.

33. The apparatus of claim 32 further comprising an outer stiffener shell and an inner liner for each half.

34. The apparatus of claim 33 wherein the inner liner has beveled leading edges.

35. The apparatus of claim 33 wherein the inner liner is comprised of material the same as the cylindrical tubing.

36. The apparatus of claim 32 wherein the two halves are split horizontally.

37. The apparatus of claim 32 wherein the two halves are separated by a longitudinal gap when in the clamped position.

38. The apparatus of claim 24 wherein the adjustable clamp is hydraulically operable and provides progressive grip pressure in the clamped position.

39. The apparatus of claim 24 further comprising an axial tilt device connected to the adjustable clamp.

40. The apparatus of claim 24 wherein the cylindrical tubing is HDPE pipe.

41. The apparatus of claim 24 wherein the cylindrical tubing is selected from a group including: plastic pipe, metal pipe and well screens.

42. The apparatus of claim 24 further comprising at least one support for the cylindrical tubing.

43. The apparatus of claim 24 wherein said adjustable clamp is pivotally connected to the moveable carriage.

44. A method for inserting a flexible first material into a second material comprising the steps of:
   a) providing a moveable carriage;
   b) attaching an adjustable clamp to the moveable carriage wherein the adjustable clamp is adjustable between an open position and a clamped position on the flexible first material;
   c) placing the flexible first material within the adjustable clamp;
   d) placing the adjustable clamp in the clamped position;
   e) moving the moveable carriage so as to insert the flexible first material into the second material beginning with a leading end; and
   f) providing a casing and configuring the casing to receive and support the flexible first material as the flexible first material is inserted into the second material.

45. The method of claim 44 further comprising the steps of:

a) placing the adjustable clamp in the open position and moving the moveable carriage away from the leading end;

b) placing the adjustable clamp in the clamped position and moving the moveable carriage toward the leading end; and c) repeating steps "a" and "b" until a desired amount of flexible first material has been inserted into the second material.

46. The method of claim 44 further including steps for removing the flexible first material from the second material comprising the steps of:

a) placing the adjustable clamp in the open position and moving the moveable carriage toward the leading end;

b) placing the adjustable clamp in the clamped position;

c) moving the moveable carriage away from the leading end; and d) repeating steps "a", "b" and "c" until a desired amount of flexible first material is removed from the second material.

* * * * *